(12) United States Patent
Kim et al.

(10) Patent No.: US 8,386,799 B2
(45) Date of Patent: Feb. 26, 2013

(54) METHODS AND APPARATUSES FOR PROVIDING DRM INTEROPERABILITY

(75) Inventors: Jong Kim, Gyeongbuk (KR); Sangho Lee, Gyeonggi-do (KR); Heejin Park, Daegu (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 432 days.

(21) Appl. No.: 12/630,646

(22) Filed: Dec. 3, 2009

(65) Prior Publication Data
US 2010/0138671 A1  Jun. 3, 2010

(30) Foreign Application Priority Data
Dec. 3, 2008  (KR) .................. 10-2008-0121568

(51) Int. Cl.
*G06F 21/00* (2006.01)
(52) U.S. Cl. .................. 713/189; 713/190
(58) Field of Classification Search ........... 713/185–189
See application file for complete search history.

(56) References Cited

U.S. PATENT DOCUMENTS

2008/0022122 A1 *  1/2008  Parkinson et al. ............. 713/185
2008/0046758 A1 *  2/2008  Cha et al. ..................... 713/189
2008/0195871 A1 *  8/2008  Peinado et al. ............... 713/189

OTHER PUBLICATIONS

Ateniese, G., Fu, K., Green, M., Hohenberger, S., "Improved Proxy Re-Encryption Schemes with Applications to Secure Distributed Storage", ACM Transactions on Information and System Security, vol. 9, No. 1, Feb. 2006, 30 pages.

* cited by examiner

*Primary Examiner* — Philip Chea
*Assistant Examiner* — Ghazal Shehni
(74) *Attorney, Agent, or Firm* — Osha Liang LLP (57) ABSTRACT

Methods and apparatuses for providing DRM interoperability are provided. Proxy re-encryption technique using bilinear map is used, and the same content can be used in different devices. According to the method of providing DRM interoperability includes in proxy agent with respect to digital rights management (DRM) service providers and device which supports predetermined DRM, first DRM service provider, second DRM service provider, the proxy agent, and the device identify each other, and proxy re-encrypt an interoperable content (IC) and provide the IC to the device. The IC is second-level encrypted by using a key of the first DRM service provider, and the proxy re-encryption is performed by using a proxy key generated from proxy key information provided from the first DRM service provider and the second DRM service provider. Therefore, a problem in which interoperability cannot be guaranteed since a DRM technique depends on a service provider is resolved.

19 Claims, 7 Drawing Sheets

| Content | Metadata | Identifier, creator, name, replay type, $PRE2_{EK1,EK2}(K_M)$ |
|---|---|---|
| | Encrypted content | $SE_{KM}(M)$ |
| License | \multicolumn{2}{c}{$PAK(EK_2)$} |

| Component | Registration information |
|---|---|
| Device | DRM identifier, PA identifier |
| PA | DRM identifier, device identifier |
| $DRM_{owner}$ | Device identifier, PA identifier, content identifier, $EK_1$, $EK_2$ |
| $DRM_{desire}$ | Device identifier, PA identifier, content identifier, $CEK_A$ |
| KGC | DRM identifier, device identifier, PA identifier |

FIG. 7

METHODS AND APPARATUSES FOR PROVIDING DRM INTEROPERABILITY

CROSS-REFERENCE TO RELATED APPLICATION

This application claims priority to Korean Patent Application No. 2008-121568 filed on Dec. 3, 2008 in the Korean Intellectual Property Office (KIPO), the entire contents of which are hereby incorporated by reference.

BACKGROUND

1. Technical Field

Example embodiments of the present invention relates in general to a digital rights management (DRM) and more specifically to methods and apparatuses for providing DRM interoperability.

2. Description of the Related Art

Development of a digital distribution technology enables users to more easily enjoy various contents. However, as the number of users who illegally use contents has increased, a digital rights management (hereinafter, "DRM") has been introduced to prevent illegal copy and to distribute contents safely and transparently. However, existing DRM techniques do not guarantee interoperability between content providers since content providers employ different DRM techniques. This causes a problem in that users have to purchase a single content several times to use it in different devices.

Figure 1:
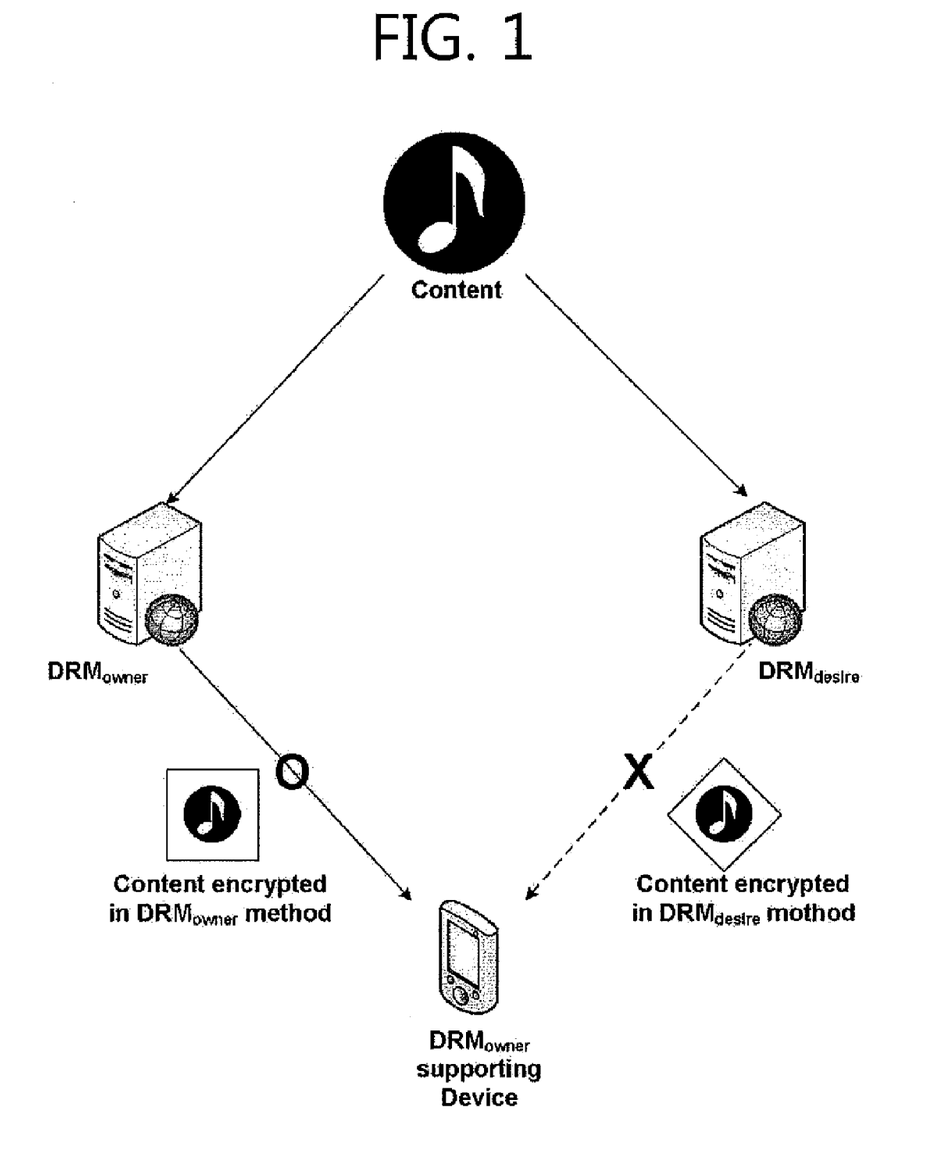
FIG. 1 is a concept diagram for explaining a problem occurring in an environment in which a plurality of DRM service providers and a specific DRM supporting device are present.

FIG. 1 is a concept diagram for explaining a problem occurring in an environment in which a plurality of DRM service providers and a specific DRM supporting device are present. The same content may be encrypted by a plurality of different DRM techniques and distributed in a content market. It is understood from FIG. 1 that the same content is encrypted by techniques of a DRMownerand a DRMdesire which are different DRM service providers and distributed. However a content replay device having a limited resource and performance is difficult to support all kinds of DRM techniques which are shown on the content market. That is, a device which supports only a specific DRM technique can replay only a content which is encrypted by a specific DRM technique. Therefore, as illustrated in FIG. 1, a device which supports the DRMowner cannot replay a content which is encrypted by a DRMdesire technique.

Figure 2:
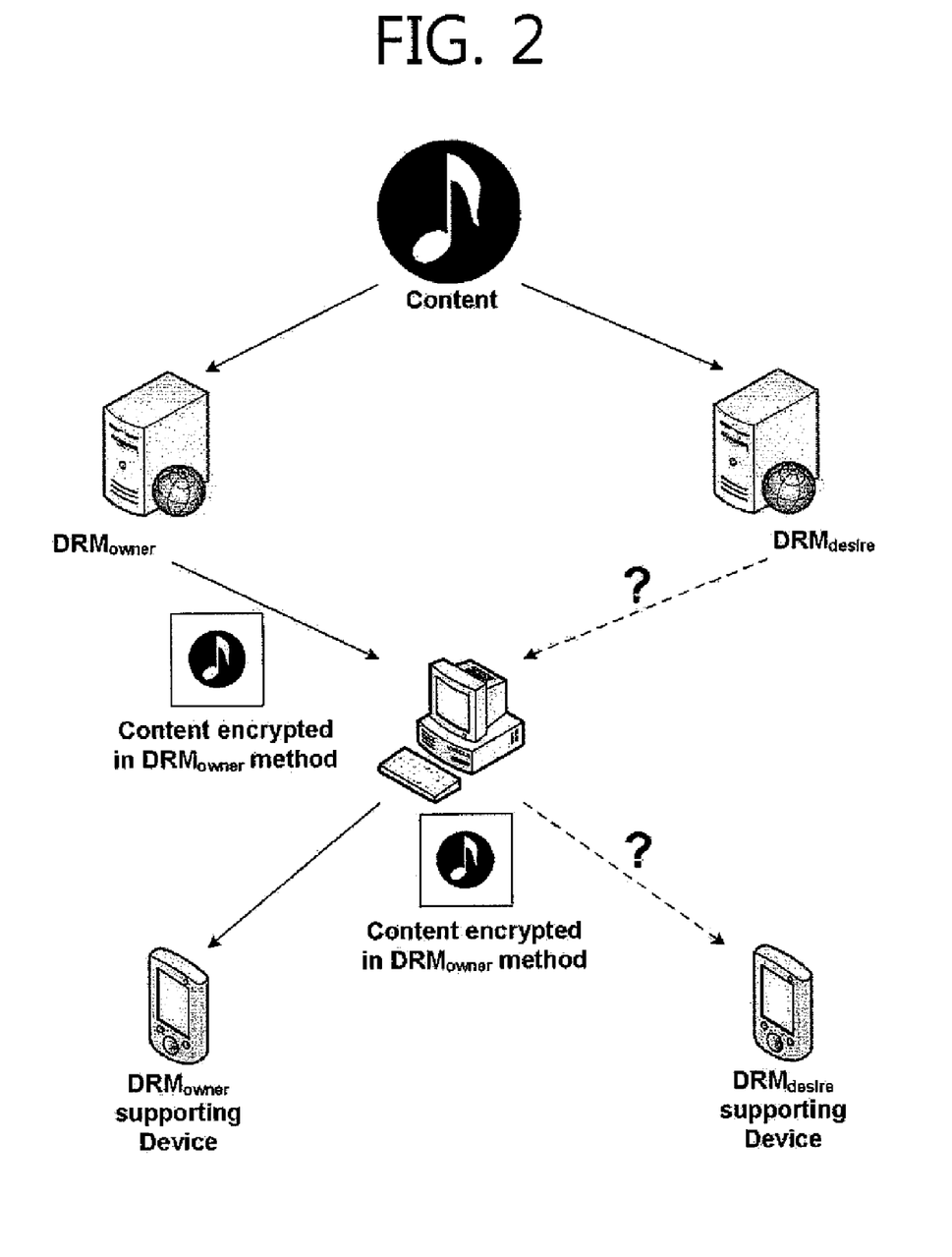
FIG. 2 is a concept diagram for explaining a problem occurring in an environment in which a plurality of DRM service providers and a plurality of specific DRM supporting devices.

FIG. 2 is a concept diagram for explaining a problem occurring in an environment in which a plurality of DRM service providers and a plurality of specific DRM supporting devices. Typically, a user downloads a content to his/her personal computer (PC), transmits the content to a portable or handheld device such as an MP3 player, a portable media player (PMP), a personal digital assistant (PDA), and replays the content in the portable device. Referring to FIG. 2, for example, when the user has purchased a content encrypted by the DRMowner technique from the DRMowner and has stored the content in his/her PC, in order to replay a device which supports the DRMdesire technique, the user has to purchase a content encrypted by the DRMdesire technique from the DRMdesire.

In order to resolve the problems, a transmission interface standardization technique has been suggested. A content is transmitted between devices according to a standard format which is previously agreed. Export/Import (EXIM) and Intellectual Property Management and Protection (IPMP) are representative techniques and have a merit that interference of an external DRM element is not needed and each DRM service provider does not need to open her own security element to a third party. Generally, the DRM service provider desires to trace a sold content in order to pursue a profit and to be given compensation for it, while according to the transmission interface standardization technique, a license is modified inside a device before transmitted. Therefore, there is a problem in that the DRM service provider cannot trace a content with high reliability and cannot be guaranteed a profit.

As another resolution, a technique using an intermediary has been suggested. The intermediary has already known security elements of all DRMs and converts a content and a license according to respective DRM formats between devices using the security elements. This technique has an advantage that existing DRM-related devices do not need to be modified but has a disadvantage that the intermediary has to know all security elements. Similarly to the transmission interface standardization technique, the DRM service provider cannot trace whether or not her content is used with high reliability and cannot be guaranteed a profit.

The above-mentioned techniques are under the assumption that DRM security elements, that is, an encryption method and a content format, are opened or standardized when a content is transmitted. However, since a problem in that the DRM service provider cannot be guaranteed a profit and an additional security problem which will occur due to interoperability support cannot be resolved, the techniques are difficult to be adopted.

SUMMARY

Accordingly, example embodiments of the present invention are provided to substantially obviate one or more problems due to limitations and disadvantages of the related art.

Example embodiments of the present invention provide a method of providing DRM interoperability in which a service provider's right is preserved.

Example embodiments of the present invention also provide a recording medium recording a command program which is executed and read by a digital processing device which performs a method of providing DRM interoperability in which a service provider's right is preserved.

Example embodiments of the present invention also provide an apparatus for providing DRM interoperability in which a service provider's right is preserved.

In some example embodiments, a method of providing DRM interoperability in a proxy agent with respect to a plurality of digital rights management (DRM) service providers and a device which supports a predetermined DRM, includes: at a first DRM service provider, a second DRM service provider, the proxy agent, and the device, identifying each other; and proxy re-encrypting an interoperable content (IC) provided from the first DRM service provider and providing the IC to the device, wherein the IC is second-level encrypted by using a key of the first DRM service provider, and the proxy re-encryption is performed by using a proxy key generated from proxy key information provided from the first DRM service provider and the second DRM service provider.

The identifying of each other may include at the device, providing the proxy agent with a device identifier and a DRM identifier supported by the device; and at the proxy agent, providing the first DRM service provider and the second DRM service provider with the device identifier and the a proxy agent identifier.

The IC may include metadata, an encrypted content, and a license.

The metadata may include at least one of a content identifier, a content creator, a content name, a content replay type, and a result in which a key KM used to encrypt the encrypted content is second-level encrypted.

The license may include a key EK2 used to second-level encrypt the key KM.

The key EK2 included in the license may be encrypted by a public key or a secret key of the proxy agent.

The first DRM service provider may be a content management server, and the device is a handheld device.

The identifying of each other may include at the first DRM service provider, the second DRM service provider, the proxy agent, and the device, identifying each other, and the proxy re-encrypting of the interoperable content (IC) may include: receiving an IC including a second-level encrypted key by using a key of the first DRM service provider from the first DRM service provider; receiving proxy key information from the first DRM service provider and the second service provider through a key generation center; generating a proxy key using the proxy key information; proxy re-encrypt the second-level encrypted key included in the IC by using the proxy key to generate a first-level encrypted key; and providing the device with the IC including the first-level encrypted key.

The identifying of each other may include, at the first DRM service provider, providing the key generation center with the device identifier, a DRM identifier supported by the first DRM service provider, and the proxy agent identifier.

The method of providing DRM interoperability may further include providing the device with a key used to decrypt the first-level encrypted key from the second DRM service provider.

In other example embodiments, a recording medium recording a command program which is executed and read by a digital processing device which performs a method of providing DRM interoperability in a proxy agent with respect to a plurality of digital rights management (DRM) service providers and a device which supports a predetermined DRM, includes: at a first DRM service provider, a second DRM service provider, the proxy agent, and the device, identifying each other; and proxy re-encrypting an interoperable content (IC) provided from the first DRM service provider and providing the IC to the device, wherein the IC is second-level encrypted by using a key of the first DRM service provider, and proxy re-encryption is performed by using a proxy key generated from a proxy key information provided from the first DRM service provider and the second DRM service provider.

In still other example embodiments, an apparatus of providing DRM interoperability with respect to a plurality of digital rights management (DRM) service providers and a device which supports a predetermined DRM, includes: at least one processor which identifies a first DRM service provider, a second DRM service provider, and the device and is identified by the first DRM service provider, the second DRM service provider, and the device, proxy re-encrypts an interoperable content (IC) provided from the first DRM service provider and provides the IC to the device; and a memory connected with the processor to store the IC, wherein the IC is second-level encrypted by using a key of the first DRM service provider, and the processors performs the proxy re-encryption by using a proxy key generated from proxy key information provided from the first DRM service provider and the second DRM service provider.

The processor may receive a device identifier and a DRM identifier supported by the device from the device and provide the device identifier and a proxy agent identifier to the first DRM service provider and the second DRM service provider.

The IC may include metadata, an encrypted content, and a license.

The metadata may include at least one of a content identifier, a content creator, a content name, a content replay type, and a result in which a key KM used to encrypt the encrypted content is second-level encrypted.

The license may include a key EK2 used to second-level encrypt the key KM.

The key EK2 included in the license may be encrypted by a public key or a secret key of the proxy agent.

The processor may identify the first DRM service provider, the second DRM service provider, a key generation center, and the device and is identified by the first DRM service provider, the second DRM service provider, a key generation center, and the device, receive an IC including a second-level encrypted key by using a key of the first DRM service provider from the first DRM service provider; receive proxy key information from the first DRM service provider and the second service provider through a key generation center; generate a proxy key using the proxy key information; proxy re-encrypt the second-level encrypted key included in the IC by using the proxy key to generate a first-level encrypted key; and provide the device with the IC including the first-level encrypted key.

The first DRM service provider may provide the key generation center with the device identifier, a DRM identifier supported by the first DRM service provider, and the proxy agent identifier.

The second DRM service provider may provide the device with a key used to decrypt the first-level encrypted key.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

While the invention is susceptible to various modifications and alternative forms, specific embodiments thereof are shown by way of example in the drawings and will herein be described in detail.

However, it should be understood that there is no intent to limit the invention to the particular forms disclosed, but on the contrary, the invention is to cover all modifications, equivalents, and alternatives falling within the spirit and scope of the invention. In the drawings, like reference numerals denote like parts. In the drawings, like parts are denoted by like reference numerals even though illustrated in different drawings. In the following description, a detailed description of known functions and configurations incorporated herein will be omitted when it may make the subject matter of the present invention rather unclear.

It will be understood that, although the terms first, second, A, B, etc. may be used herein to describe various elements, these elements should not be limited by these terms. These terms are only used to distinguish one element from another.

For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An example embodiment of the present invention employs a modified proxy re-encryption technique in which a bilinear map is used. Since the proxy re-encryption technique is used, it is possible to prevent a content from being exposed to a third party in a non-encrypted state at a transmission stage.

A first-level encryption refers to a general encryption technique. In this case, for example, a content may be encrypted using a key CEKA or decrypted using CEKA. A second-level encryption refers to an encryption technique which is performed in advance in order to perform the proxy re-encryption later. A first-level encrypted content is generated by proxy re-encrypting a second-level encrypted content.

The first-level encryption may be expressed by Equation (1) as follows.

$$PRE1_{CEKA}(K_M) = e(g, h_i)^{CEK_A \cdot \tau}, K_M \cdot e(g, h_i)^{\tau} \quad \text{Equation (1)}$$
$$= Z_i^{CEK_A \cdot \tau}, K_M \cdot Z_i^{\tau},$$

where g denotes a decimal, and $h_i$ is a decimal as a random number of an i-period which makes different result values generated even though the same content is encrypted. $CEK_A$ is a key of a $DRM_{desire}$ used to encrypt a content to be finally transmitted to a device. $K_M$ is a plaintext as a first-level encryption target and functions as a key used to encrypt an original content M from an interoperable content (IC) which will be described later. r denotes a random number, e denotes a bilinear map, and $Z_i$ is a third decimal which is bilinearly mapped from two decimals. In this case, $g \square G_1$, and $Z_i = e(g, h_i) \square G_2$, where $G_1$ and $G_2$ are sets of same decimals. A first-level encryption result may be represented by two parts which are connected by ", (comma)".

The second-level encryption may be expressed by Equation (2) as follows.

$$PRE2_{EK1, EK2}(K_M) = K'_M \quad \text{Equation (2)}$$
$$= g^{EK_1 \cdot \tau}, K_M \cdot e(g, h_i)^{EK_2 \cdot \tau}$$
$$= g^{EK_1 \cdot \tau}, K_M \cdot Z_i^{EK_2 \cdot \tau},$$

where $EK_1$ and $EK_2$ are keys of a $DRM_{owner}$ used for second-level encryption of $K_M$.

A proxy key ($\pi iA$) may be expressed by Equation (3) as follows.

$$\pi_i^A = (h_i^{CEK_A/EK_1})^{EK_2} \quad \text{Equation (3).}$$

The proxy re-encryption may be expressed by Equation (4) as follows.

$$RE(K_M)\pi_i^A = e(g^{EK_1 \cdot \tau}, \pi_i^A), K_M \cdot e(g, h_i)^{EK_2 \cdot \tau} \quad \text{Equation (4)}$$
$$= e(g, h_i)^{EK_1 \cdot \tau \cdot CEK_A \cdot EK_2/EK_1},$$
$$K_M \cdot e(g, h_i)^{EK_2} \cdot \tau$$
$$= Z_i^{CEK_A \cdot \tau'}, K_M \cdot Z_i^{\tau'} (\tau' = EK_2 \cdot \tau).$$

A proxy re-encryption result may be expressed by Equation (5) as follows.

$$RE_{PROXYKEY}(PRE2_{EK}1, EK2(KM)) = PRE1_{CEKA}(KM)) \quad \text{Equation 5.}$$

That is, as described above, a first-level encrypted plaintext KM is generated by re-encrypting a second-level encrypted plaintext KM.

Decryption may be expressed by Equation (6) as follows.

$$D_{CEK_A}(\alpha, \beta) = (\beta/\alpha)^{CEK_A} = K_M \quad \text{Equation (6).}$$

Here, a decryption result may be represented by two parts of α and β.

The modified proxy re-encryption technique using the bilinear map is a well-known technique and disclosed, for example, in Giuseppe Ateniese, Kevin Fu, "Improved Proxy Re-Encryption Schemes with Applications to Secure Distributed Storage", 2006, ACM transaction on information and system security, and thus description thereof is omitted.

The second-level encrypted content is defined as an interoperable content (IC). The IC does refer to not a content which is encrypted according to a DRM format specific to each DRM service provider but a content which is converted according to a format of an intermediate form. A proxy agent (hereinafter, PA) stores contents of an IC form. The IC may be encrypted by a key specific to the PA and stored.

Figure 3:
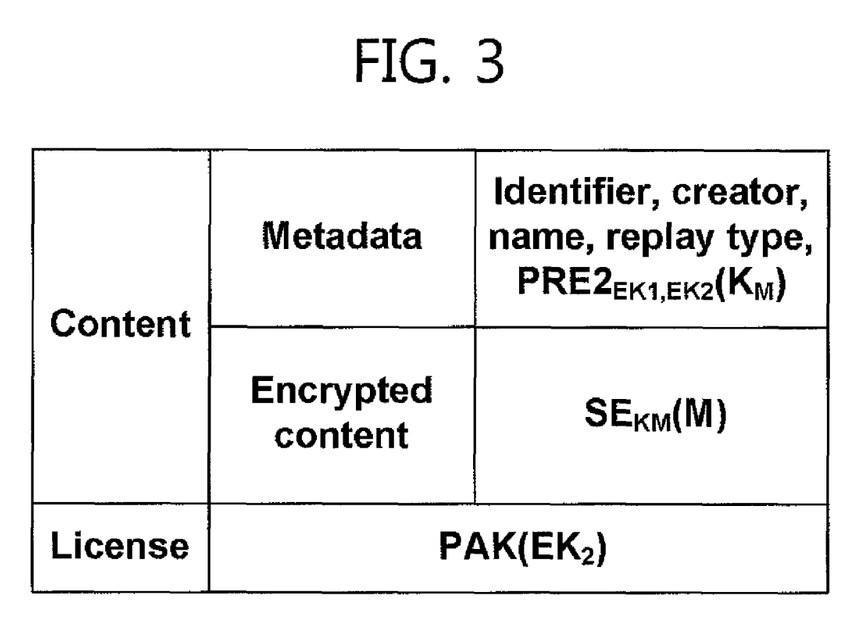
FIG. 3 is a table illustrating items of an IC used in a method of providing DRM interoperability according to an example embodiment of the present invention.

FIG. 3 is a table illustrating items of an IC used in a method of providing DRM interoperability according to an example embodiment of the present invention. Referring to FIG. 3, the IC includes a content and a license. The content includes metadata and an encrypted content.

The metadata includes a content identifier, a content creator, a content name, a content replay type, and a result in which a key KM used for encryption of the encrypted content SEKM(M) is second-level encrypted.

The encrypted content SEKM(M) is a result in which the original content M which is not encrypted is encrypted by KM based on a symmetric key.

The license PAK(EK2) is a PAK which is a key of a PA 140 and a result in which a key EK2 of the DRMowner is encrypted. The PAK is a key held by the PA and may be a public key corresponding to a private key of the PA or a secret key based on a symmetric key.

The whole IC is not encrypted by the second-level encryption, but only KM which is the key used to encrypt the original content M based on the symmetric key is encrypted by the second-level encryption. This is to reduce an overhead of a public key encryption technique.

The method of providing DRM interoperability according to an example embodiment of the present invention includes a registration phase and a transmission phase.

Figure 4:
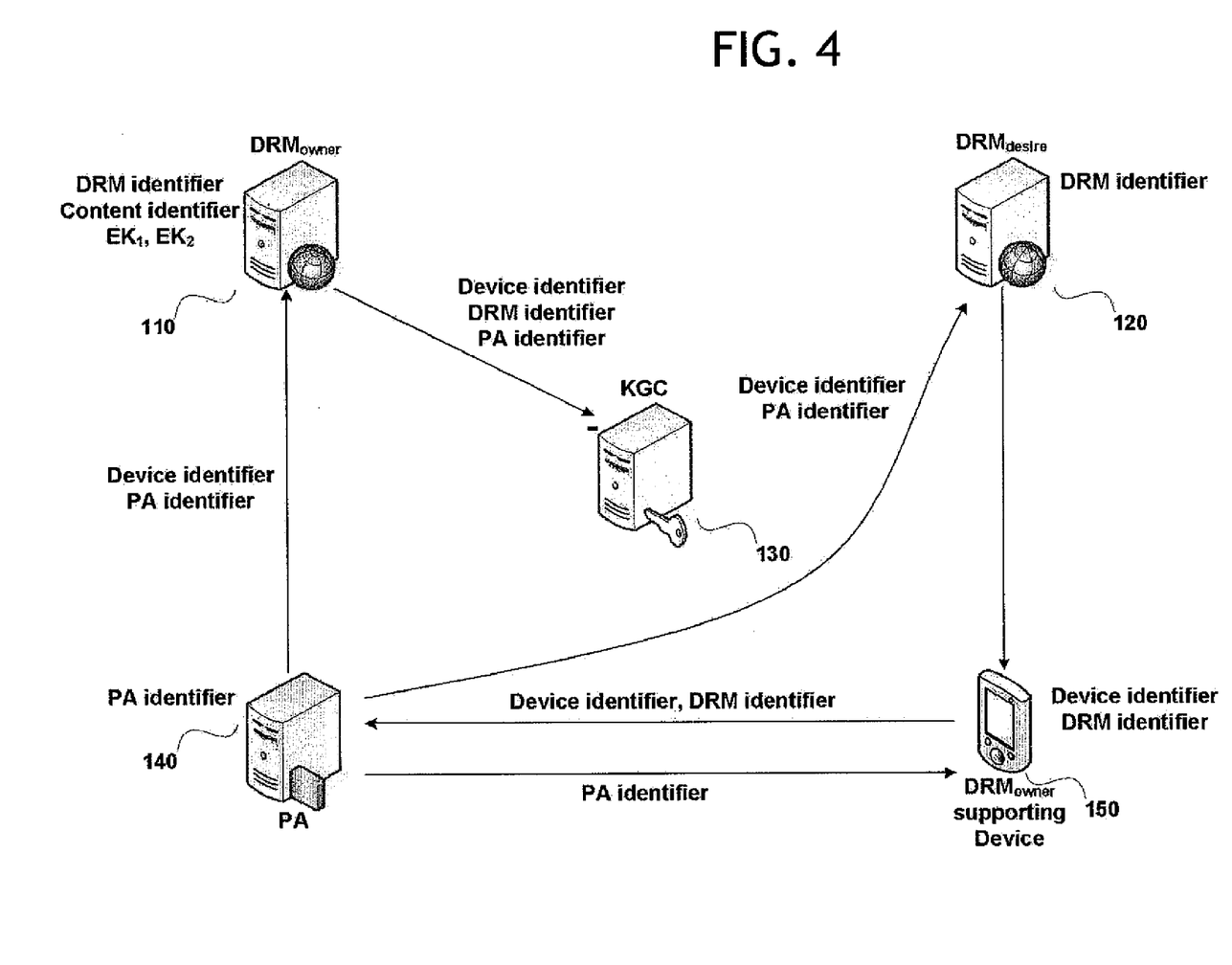
FIG. 4 is a concept diagram illustrating the registration process of a method of providing DRM interoperability according to an example embodiment of the present invention.

FIG. 4 is a concept diagram illustrating the registration process of the method of providing DRM interoperability according to an example embodiment of the present invention.

A DRM service provider refers to a service provider which sells DRM contents. A DRMowner 110 is a DRM service provider which first sells a content, and a DRMdesire 120 is a DRM service provider to which a device which desires to replay a content belongs.

A key generation center (KGC) 130 is a component which generates key information used to perform the proxy re-encryption which will be described later.

A PA generates a proxy key using proxy key information received from the KGC 130 and performs the proxy re-encryption using the generated proxy key. Therefore, there are advantages that pre-packaging of a content is possible, a device does not need to manage a key by itself, and a neutral payment system can be provided.

A device 150 refers to a device which can decrypt and replay a content which is encrypted by a predetermined DRM method. The device 150 may be a handheld device such as an MP3 player, a PMP, and a PDA.

Even though not illustrated in FIG. 4, a payment server is similar to a payment server of an existing DRM system and a component which pays a user's money to a service provider after confirming whether or not the user is provided with a corresponding service. The payment server is a trusted third party (TTP), and a license trust when converting a content for a different device is well-known to a person having ordinary skill in the art, and description thereof is omitted.

The user of the device 150 registers his/her device 150 to the PA 140 before purchasing the IC. At this time, since the DRM service provider of the device 150 is the DRMowner 110, a device identifier and a DRM identifier of the DRMowner 110 are registered to the PA 140 together. In this process, the device 150 receives a PA identifier from the PA 140.

The user of the device 150 makes a payment to the DRMowner 110 through the PA 140 to purchase the IC. At this time, the IC is an IC which second-level encrypted by using the keys EK1 and EK2 held by the DRMowner 110. In this step, the DRMowner 110 receives the device identifier and the PA identifier from the PA 140 and transmits the device identifier and the PA identifier and the DRM identifier held by itself to the KGC 130. The DRMowner 110 holds a content identifier of a content purchased by the user.

Figure 5:
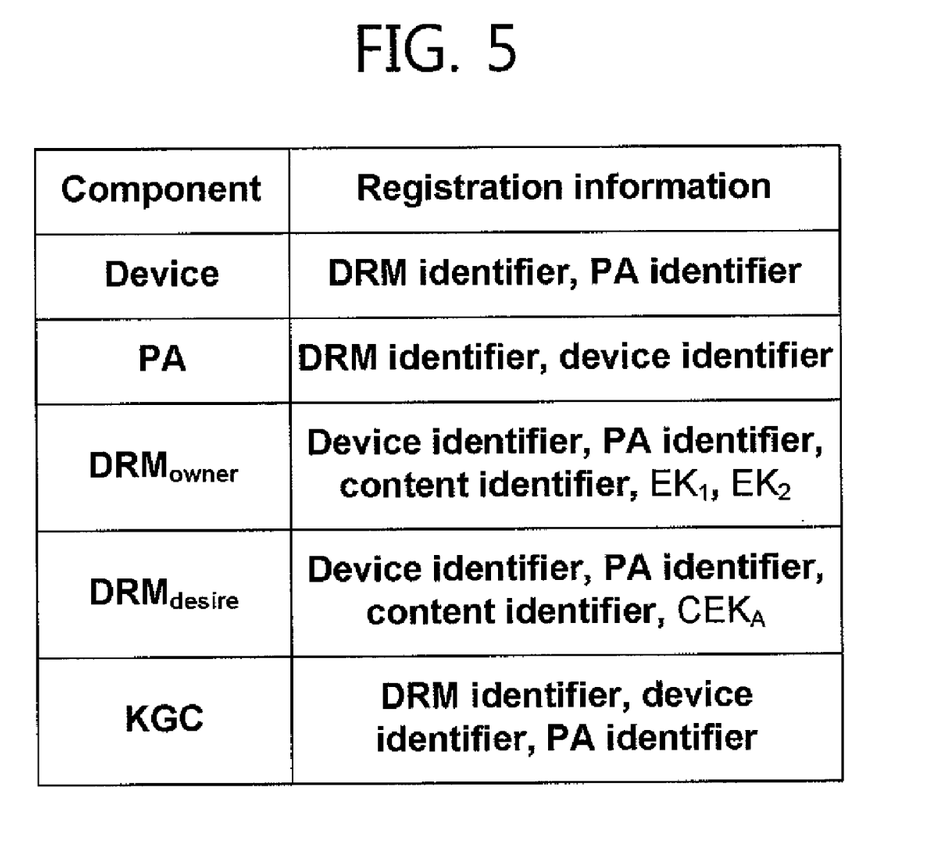
FIG. 5 illustrates registration information held by components used in a method of providing DRM interoperability according to an example embodiment of the present invention.

FIG. 5 illustrates registration information held by components used in the method of providing DRM interoperability according to an example embodiment of the present invention. As a result of performing the above-described process, the components 110, 120, 130, 140, and 150 have information illustrated in FIG. 5. Through the registration phase, the components 110, 120, 130, 140, and 150 have identifiers and other information which can be recognized therebetween and can perform the proxy re-encryption in the transmission phase which will be described later.

Figure 6:
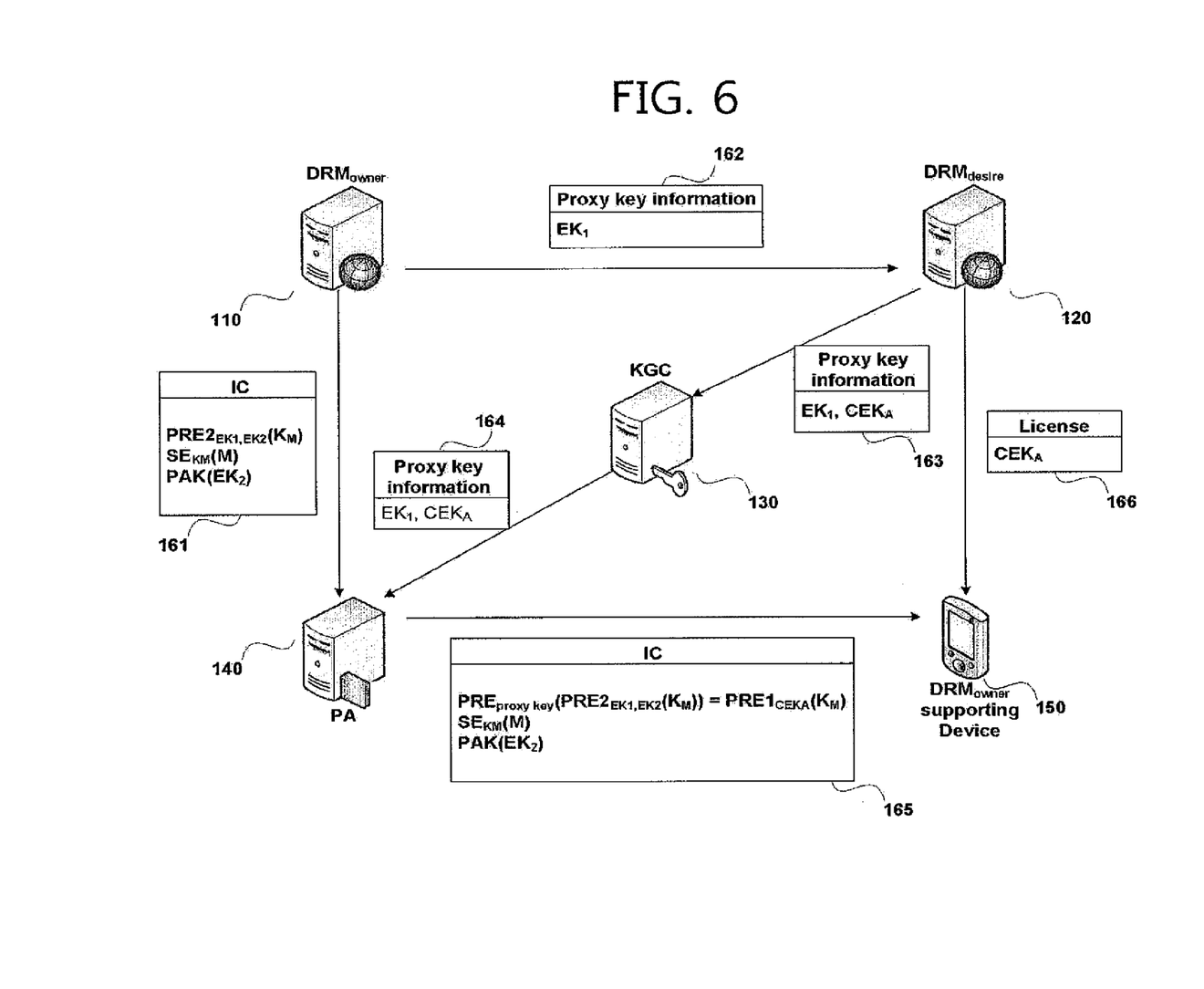
FIG. 6 is a concept diagram illustrating the transmission phase of a method of providing DRM interoperability according to an example embodiment of the present invention.

FIG. 6 is a concept diagram illustrating the transmission phase of the method of providing DRM interoperability according to an example embodiment of the present invention.

Referring to FIG. 6, when the user of the device 150 purchases the content from the DRMowner 110 for the first time and requests the content, a content (IC) 161 which is encrypted by the second-level encryption is provided to the PA 140 from the DRMowner 110 and stored in the PA 140. As described above, the whole IC 161 is not encrypted by the second-level encryption, but only the key KM which is used to encrypt the original key M based on the symmetric key is encrypted by the second-level encryption.

Security elements of the DRMowner 110 and the DRMdesire 120 which are service providers which agree to support the DRM interoperability, that is, unique encryption algorithms of the DRM service providers 110 and 120, are not opened to the outside and included in a device which supports the DRM methods of the DRM service providers 110 and 120. For example, when the PA 140 proxy re-encrypts and transmits the second-level encrypted content, the device 150 which supports the DRM of the DRMowner 110 can receive the proxy re-encrypted content, convert the proxy re-encrypted content according to the DRM format of the DRMowner 110 and replay the content. The DRMowner 110 sells the content in the form of the IC, and the PA 140 performs the proxy re-encryption of the encrypted KM included in the IC. Since the PA 140 cannot know both of EK1 and EK2 which are keys of the DRMowner 110, the security elements of the DRMowner 110 are not exposed to the PA 140.

The PA 140 requests the KGC 130 to transmit proxy key information, and the KGC 130 requests the DRMowner 110 and the DRMdesire 120 to transmit proxy key information. The DRMowner 110 transmits proxy key information (hi1/EX1) 162 including EK1 to the DRMdesire 120, and the DRMdesire 120 generates proxy key information (hiCEKA/EX1) 163 including EK1 and CEKA and transmits the proxy key information to the KGC 130. CEKA is a secret key which is generated and held by the DRMdesire 120. The PA 140 receives proxy key information (hiCEKA/EX1) 164 including EK1 and CEKA from the KGC 130. The PA 140 generates a proxy key ($\pi iA$, Equation (3)) by using the proxy key information 164 and EK2 decrypted from the license PAK (EK2) of the IC 161, and performs proxy re-encryption of second-level encrypted KM included in metadata of the IC 161, that is, PRE2EK1,EK2(KM), by sing the generated proxy key.

As described above with reference to FIG. 3, the license PAK(EK2) is a PAK as a key of the PA 140 and a result in which the key EK2 of the DRMowner 110 is encrypted. The PAK is a key held by the PA 140 and may be a public key corresponding to a private key of the PA 140 or a secret key based on a symmetric key. Therefore, the PA 140 can always decrypt EK2. As described above, since the PA 140 can know EK2 as the key of the DRMowner 110 through decryption but cannot know EK1, it cannot say that the security element of the DRMowner 110 is exposed to the PA 140.

The PA 140 replaces PRE2EK1,EK2(KM) of the metadata of the IC 161 with a proxy re-encryption result (REPROXYKEY(PRE2EK1,EK2(KM))=PRE1CEKA(KM), Equation (5)) and transmits the resultant IC 165 to the device 150. As described above, not the whole content but an encrypted key part of the metadata is proxy re-encrypted.

The device 150 receives a license including encrypted CEKA issued from the DRMdesire 120 and replays the IC 165 by using CEKA.

In further detail, the DRMdesire 120 transmits CEKA of a license, which will be issued to the device 150 later, together the proxy key information 163 to the KGC 130. Therefore, when the proxy re-encryption is performed by using the information, the same result as encrypted using CEKA as a key is obtained (REPROXYKEY(PRE2EK1,EK2(KM))=PRE1CEKA(KM), Equation (5)). The device 150 extracts KM included in the metadata of the IC 165 received from the PA 140 by using the CEKA of the license issued from the DRMdesire 120, decrypts SEKM(M) by using the extracted KM to obtain the original content M, converts into a content which is encrypted according to a DRM format supported by itself, for example, a DRM format of the DRMowner 110, and replays the content.

According to the method of providing DRM interoperability according to an example embodiment of the present invention, even though a content is re-distributed to a different device, the content is always replayed by a license, and a DRM service provider can trace where its content and license are used, thereby satisfying a DRM purpose. That is, it is impossible to decrypt KM if CEKA is not issued from the DRMdesire.

Further, any attacker cannot be disguised as a legal component inside a system model. A fake KGC or PA cannot communicate with the DRMS (DRM service provider). Even if both the PA and the KGC are malicious attackers, the DRM service provider does not illegally distribute the content to pursue its own profit, and thus it is impossible to bring final proxy information.

Further, a content stored in the PA is a second-level encrypted content. The proxy re-encryption is an encryption technique in which encryption and decryption are performed at once without decrypting to a plaintext, and thus the PA cannot see a non-encrypted content.

An attack for replaying a content encrypted in the PA in a different device or applying a proxy key generated by using proxy key information received from the KGC to a different content is called a replay attack. In order to successfully perform the proxy encryption, respective proxy key information has to be accurately collected in the PA, and the PA receives operation resultant values of the values and thus does not know the respective values. Since a content, a license, and a key value are used together to generate one new content, it is difficult to generate a new one from an existing one. When a certain device illegally taps to obtain a content of a different device, the device has to have a license issued from the DRMdesire in order to replay the content. However, since an appropriate license cannot be issued from a DRM service provider which does not participate in generating a proxy key, a fake device cannot replay the content.

When a content has been re-distributed, since the device receives a license newly issued from each DRM service provider, access and a use right according to re-distribution are newly set.

Further, the DRM service provider can be guaranteed a profit for interoperability through a payment scenario through the payment server.

Figure 7:
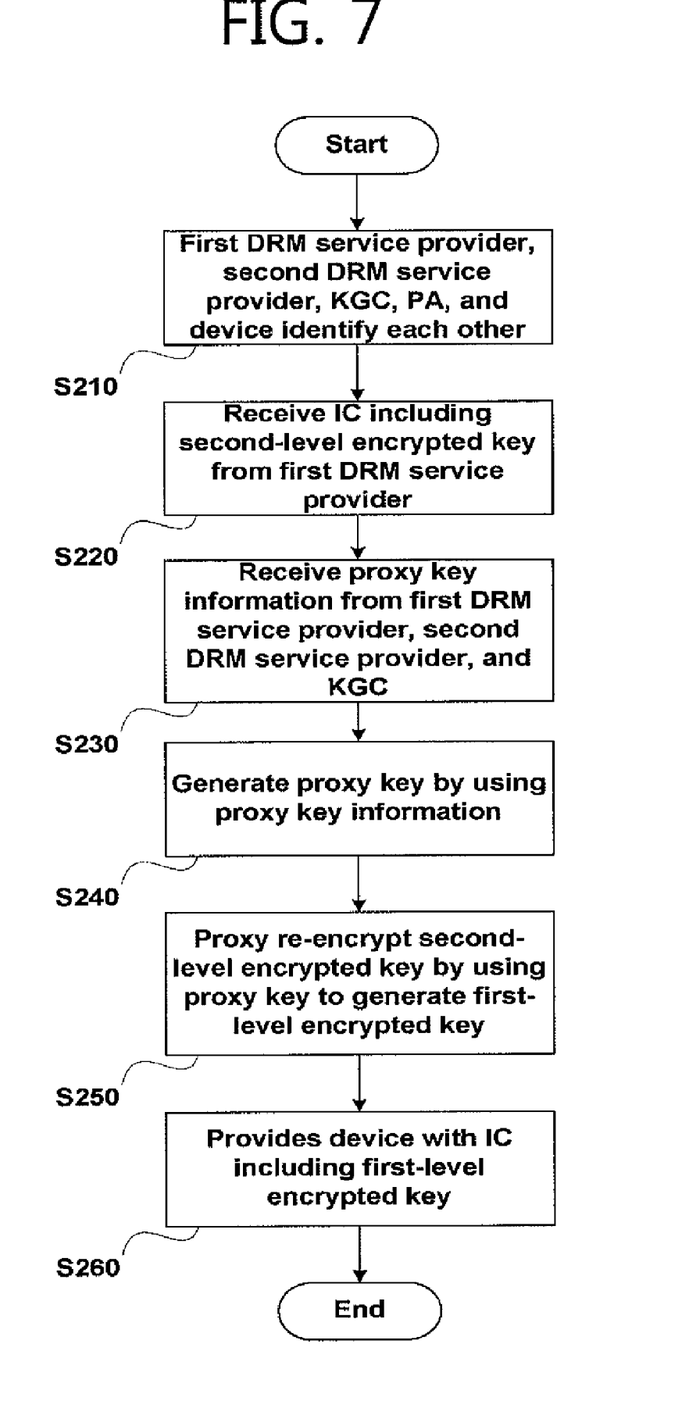
FIG. 7 is a flowchart illustrating a procedure of a method of providing DRM interoperability according to an example embodiment of the present invention.

FIG. 7 is a flowchart illustrating a procedure of the method of providing DRM interoperability according to an example embodiment of the present invention.

Referring to FIG. 7, a first DRM service provider, a second DRM service provider, a PA, and a device identify each other (S210). Step S210 and registration information held as an identifying result can be understood by identifier transmission performed among the DRMowner 110, the DRMdesire 120, the KGC 130, PA 140, and the device 150 and registration information held by the components 110, 120, 130, 140, and 150, which is described above with reference to FIGS. 4 and 5, and thus description thereof is omitted.

Next, an IC including a second-level encrypted key is received from the first DRM service provider (S220), and proxy key information is received from the second DRM service provider and the KGC (S230). Steps S220 and S230 can be understood by the structure of an IC which is described above with reference to FIG. 3 and proxy key transmission performed among the DRMowner 110, the DRMdesire 120, the KGC 130, and the PA 140, which is described above with reference to FIG. 6, and thus description thereof is omitted.

A proxy key is generated using the proxy key information (S240), and a first-level encrypted key is generated by proxy re-encrypting the second level-encrypted key by using the proxy key (S250). Steps S240 and S250 can be understood by the proxy re-encryption technique described above with reference to Equations (1) to (6) and the process (REPROXYKEY(PRE2EK1,EK2(KM))=PRE1CEKA(KM), Equation (5)) of proxy re-encrypting PRE2EK1,EK2(KM) through the PA 140, which is described above with reference to FIG. 6, and description thereof is omitted.

An IC including a first-level encrypted key as a proxy re-encryption result is provided to a device (s260). The device can replay the IC by using a secret key CEKA issued from the second DRM service provider. Step S260 and the decryption and replay process of the device can be understood by the process in which the device extracts KM included in the metadata of the IC 165 by using CEKA of the license, and decrypts and replays SEKM(M) by using the extracted KM, which is described above with reference to FIG. 6, and description thereof is omitted.

An apparatus for providing DRM interoperability according to an example embodiment of the present invention includes at least one processor and a memory connected to the processor.

The processor identifies the first DRM service provider, the second DRM service provider, and the device, is identified by the first DRM service provider, the second DRM service provider, and the device, proxy re-encrypts an IC provided from the first DRM service provider, and transmits the IC to the device. The processor may be implemented in the form of a central processing unit (CPU), a micro chip, and a microcontroller unit (MCU).

The memory includes a computer storage medium of a volatile and/or non-volatile memory form such as a read only memory and a random access memory (RAM). The computer storage medium includes a volatile or no-volatile, portable or non-portable medium which is implemented by a certain method or technique for storing information such as a computer readable command, a data structure, a program module, or other data. The computer storage medium includes a RAM, a ROM, an EEPROM, a flash memory, other memory techniques, a CD-ROM, a DVD, other optical disk storage devices, a magnetic cassette, a magnetic tape, a magnetic disk storage device, other magnetic storage devices, and other media which are accessed by a computer and stores desired information, but is not limited thereto.

Operations of the processor and the memory can be understood by the method of providing DRM interoperability which are described above with reference to FIGS. 3 to 7, and thus description thereof is omitted.

As described above, according to the method and apparatus for providing DRM interoperability according to an example embodiment of the present invention, a problem in that interoperability is not guaranteed since a DRM technique for preventing an illegal content copy and promoting a transparent distribution depends on a service provider is resolved. Thus, a digital content is protected from illegal distribution, and the same content can be used in different devices.

When the user desires to use the same content in a different device, the content can be used again in the different device, and a problem in that the user has to access each service provider to newly download the content is resolved. The service provider can be guaranteed a profit for interoperability since a content is not exposed.

Further, when a content has been re-distributed, a content can be replayed by re-re-distribution of a new license other than the whole content.

While the example embodiments of the present invention and their advantages have been described in detail, it should be understood that various changes, substitutions and alterations may be made herein without departing from the scope of the invention.

What is claimed is:

1. A method of providing digital rights management (DRM) interoperability in a proxy agent with respect to a plurality of DRM service providers and a device which supports a predetermined DRM, comprising:
   at a first DRM service provider having keys $EK_1$ and $EK_2$, a second DRM service provider having a key $CEK_A$, the proxy agent, and the device, identifying each other; and
   proxy re-encrypting an interoperable content (IC) provided from the first DRM service provider and providing the IC to the device,
   wherein the IC comprises a key $K_M$ that is second-level encrypted using keys $EK_1$ and $EK_2$ of the first DRM service provider,
   wherein proxy re-encryption is performed by using a proxy key generated from proxy key information provided from the first DRM service provider and the second DRM service provider to provide DRM interoperability between different devices,
   wherein second-level encryption refers to an encryption technique which is performed in advance in order to perform the proxy re-encryption later,
   wherein proxy re-encrypting a second-level encrypted content generates a first-level encrypted content, and
   wherein proxy re-encrypting is expressed $PRE_{PRoxYKEY}$ $(PRE2_{EK1,EK2}(K_M))=PRE1_{CEKA}(K_M)$.

2. The method of claim 1, wherein the identifying of each other comprises:
   at the device, providing the proxy agent with a device identifier and a DRM identifier supported by the device; and
   at the proxy agent, providing the first DRM service provider and the second DRM service provider with the device identifier and a proxy agent identifier.

3. The method of claim 1, wherein the IC further comprises an encrypted content and a license.

4. The method of claim 3, wherein the IC further comprises at least one of a content identifier, a content creator, a content name, and a content replay type.

5. The method of claim 4, wherein the license includes the key $EK_2$ used to second-level encrypt the key $K_M$.

6. The method of claim 5, wherein the key $EK_2$ included in the license is encrypted by a public key or a secret key of the proxy agent.

7. The method of claim 1, wherein the first DRM service provider is a content management server, and the device is a handheld device.

8. The method of claim 1, wherein the identifying of each other comprises at the first DRM service provider, the second DRM service provider, the proxy agent, and the device, identifying each other, and the proxy re-encrypting of the interoperable content (IC) comprises:
   receiving an IC including a second-level encrypted key $K_M$ by using the keys $EK_1$ and $EK_2$ of the first DRM service provider from the first DRM service provider;
   receiving proxy key information from the first DRM service provider and the second service provider through a key generation center;
   generating the proxy key using the proxy key information;
   proxy re-encrypt the second-level encrypted key $K_M$ included in the IC by using the proxy key to generate a first-level encrypted key $K_M$; and
   providing the device with the IC including the first-level encrypted key $K_M$.

9. The method of claim 8, wherein the identifying of each other comprises at the first DRM service provider, providing the key generation center with the device identifier, a DRM identifier supported by the first DRM service provider, and a proxy agent identifier.

10. The method of claim 8, further comprising, providing the device with the key $CEK_A$ used to decrypt the first-level encrypted key $K_M$ from the second DRM service provider.

11. An apparatus of providing digital rights management (DRM) interoperability with respect to a plurality of DRM service providers and a device which supports a predetermined DRM, comprising:
   at least one processor which identifies a first DRM service provider having keys $EK_1$ and $EK_2$, a second DRM service provider having a key $CEK_A$, and the device and is identified by the first DRM service provider, the second DRM service provider, and the device, proxy re-encrypts an interoperable content (IC) provided from the first DRM service provider and provides the IC to the device; and
   a memory connected with the processor to store the IC,
   wherein the IC comprises key $K_M$ that is second-level encrypted using the keys $EK_1$ and $EK_2$ of the first DRM service provider,
   wherein the processors performs the proxy re-encryption by using a proxy key generated from proxy key information provided from the first DRM service provider and the second DRM service provider to provide DRM interoperability between different devices, wherein the second-level encryption refers to an encryption technique which is performed in advance in order to perform the proxy re-encryption later, wherein proxy re-encrypting a second-level encrypted content generates a first-level encrypted content, and wherein proxy re-encrypting is expressed as $PRE_{PROXYKEY}(PRE2_{EK1,EK2}(K_M))=PRE1_{CEKA}(K_M)$.

12. The apparatus of claim 11, wherein the processor receives a device identifier and a DRM identifier supported by the device from the device and provides the device identifier and a proxy agent identifier to the first DRM service provider and the second DRM service provider.

13. The apparatus of claim 11, wherein the IC further comprises an encrypted content and a license.

14. The apparatus of claim 13, wherein the IC further comprises at least one of a content identifier, a content creator, a content name, and a content replay type.

15. The apparatus of claim 14, wherein the license includes the key $EK_2$ used to second-level encrypt the key $K_M$.

16. The apparatus of claim 15, wherein the key $EK_2$ included in the license is encrypted by a public key or a secret key of the proxy agent.

17. The apparatus of claim 11, wherein the processor identifies the first DRM service provider, the second DRM service provider, a key generation center, and the device and is identified by the first DRM service provider, the second DRM service provider, a key generation center, and the device     receiving an IC including a second-level encrypted key $K_M$ by using keys $EK_1$ and $EK_2$ of the first DRM service provider from the first DRM service provider;

receiving proxy key information from the first DRM service provider and the second service provider through a key generation center;

generating the proxy key using the proxy key information;

proxy re-encrypting the second-level encrypted key $K_M$ included in the IC by using the proxy key to generate a first-level encrypted key $K_M$; and     providing the device with the IC including the first-level encrypted key $K_M$.

18. The apparatus of claim 17, wherein the first DRM service provider provides the key generation center with the device identifier, a DRM identifier supported by the first DRM service provider, and a proxy agent identifier.

19. The apparatus of claim 17, wherein the second DRM service provider provides the device with the key $CEK_A$ used to decrypt the first-level encrypted key $K_M$.

* * * * *